United States Patent [19]

Jentzsch et al.

[11] Patent Number: 4,660,465

[45] Date of Patent: Apr. 28, 1987

[54] SYSTEM FOR EXHAUSTING AND COLLECTING GASES, IN PARTICULAR MOTOR VEHICLE EXHAUST GASES IN ASSEMBLY OR FACTORY HALLS

[76] Inventors: Horst Jentzsch, Waldenbucher Strasse 9, D 7447 Aichtal; Berthold Schuppler, Haldenweg 37, D 7314 Wernau, both of Fed. Rep. of Germany

[21] Appl. No.: 765,190

[22] Filed: Aug. 13, 1985

[30] Foreign Application Priority Data

Aug. 18, 1984 [DE] Fed. Rep. of Germany ....... 3430525
Sep. 13, 1984 [DE] Fed. Rep. of Germany ....... 3433602

[51] Int. Cl.$^4$ .............................................. F23J 15/00
[52] U.S. Cl. ..................................... 98/115.4; 104/52
[58] Field of Search ............................ 98/115.1, 115.4; 104/52

[56] References Cited

U.S. PATENT DOCUMENTS

| | | | |
|---|---|---|---|
| 2,378,361 | 6/1945 | Miller | 98/115.4 X |
| 2,613,611 | 10/1952 | Simon | 98/115.4 X |
| 3,941,041 | 3/1976 | Sprout | 98/115.4 |
| 4,389,923 | 6/1983 | Ludscheidt | 98/115.4 |

FOREIGN PATENT DOCUMENTS 2855325 6/1980 Fed. Rep. of Germany .

Primary Examiner—Harold Joyce
Attorney, Agent, or Firm—Lowe, Price, LeBlanc, Becker & Shur

[57] ABSTRACT

A system serves for exhausting and collecting gases, in particular motor vehicle exhaust gases in an assembly or factory hall. A stationary slotted exhaust conduit (18) is provided on one face with an elastic, axial lip seal for guiding in sealed relationship a suction nozzle of at least one carriage (16) which can be moved in the axial direction along guide sections (41). The suction nozzle is connected to a hose and a vacuum is generated in the slotted exhaust conduit (18) through an exhauster. In order to avoid excessively high tensile stresses in the hose and to facilitate the return movement of carriages along a path parallel to an assembly belt, the carriage (16) is provided with a drive motor (94) whose power take-off shaft (95) carries a friction wheel (96) which can be brought into engagement with the guide section (41), and the flux of force between the drive motor (94) and the guide section (41) can be separated and closed, respectively, by an electrically switchable coupling element in the form of an electromagnet (100).

26 Claims, 12 Drawing Figures

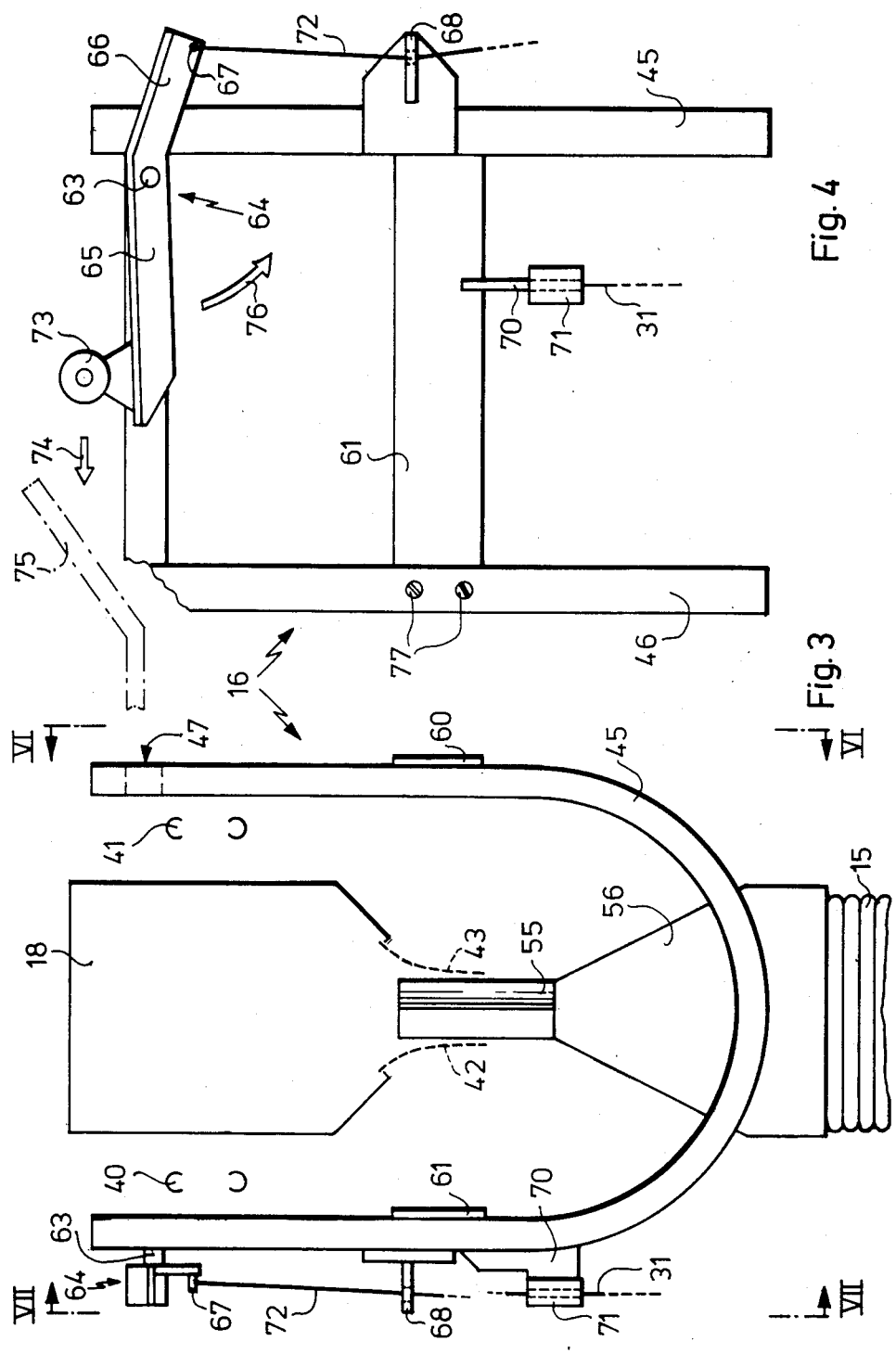

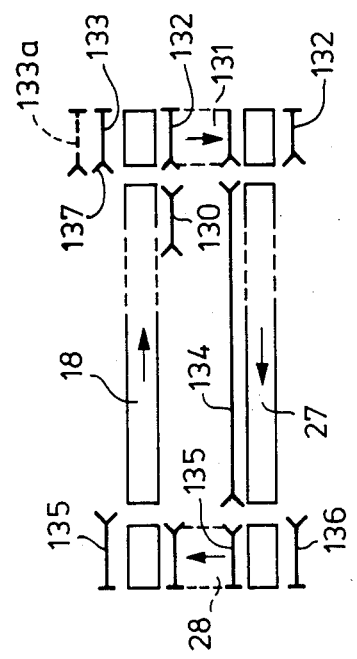
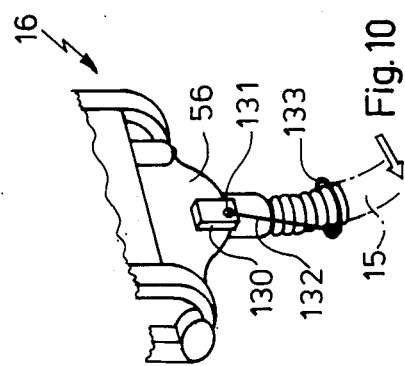
Fig. 8
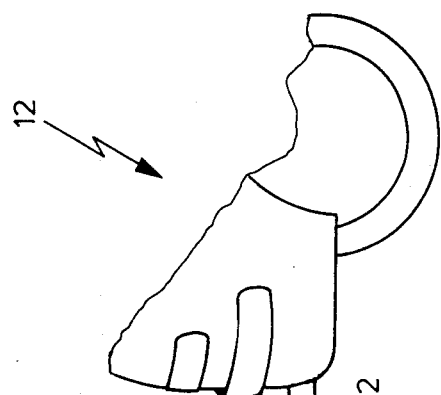
Fig. 10
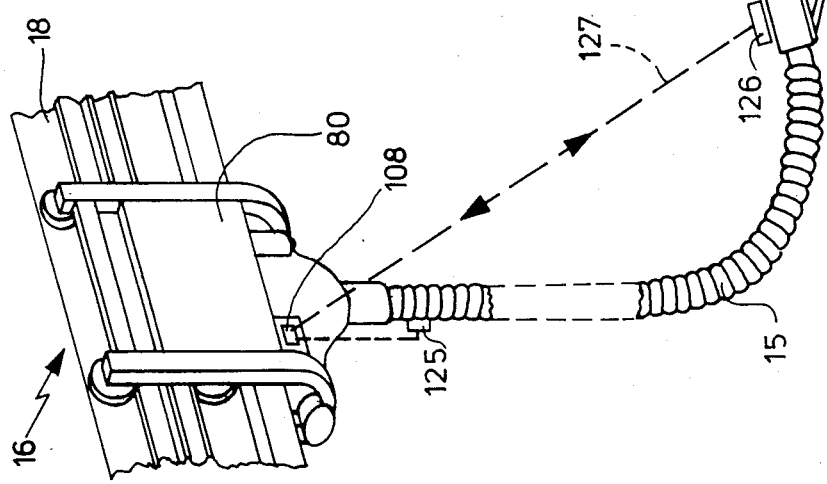
Fig. 9

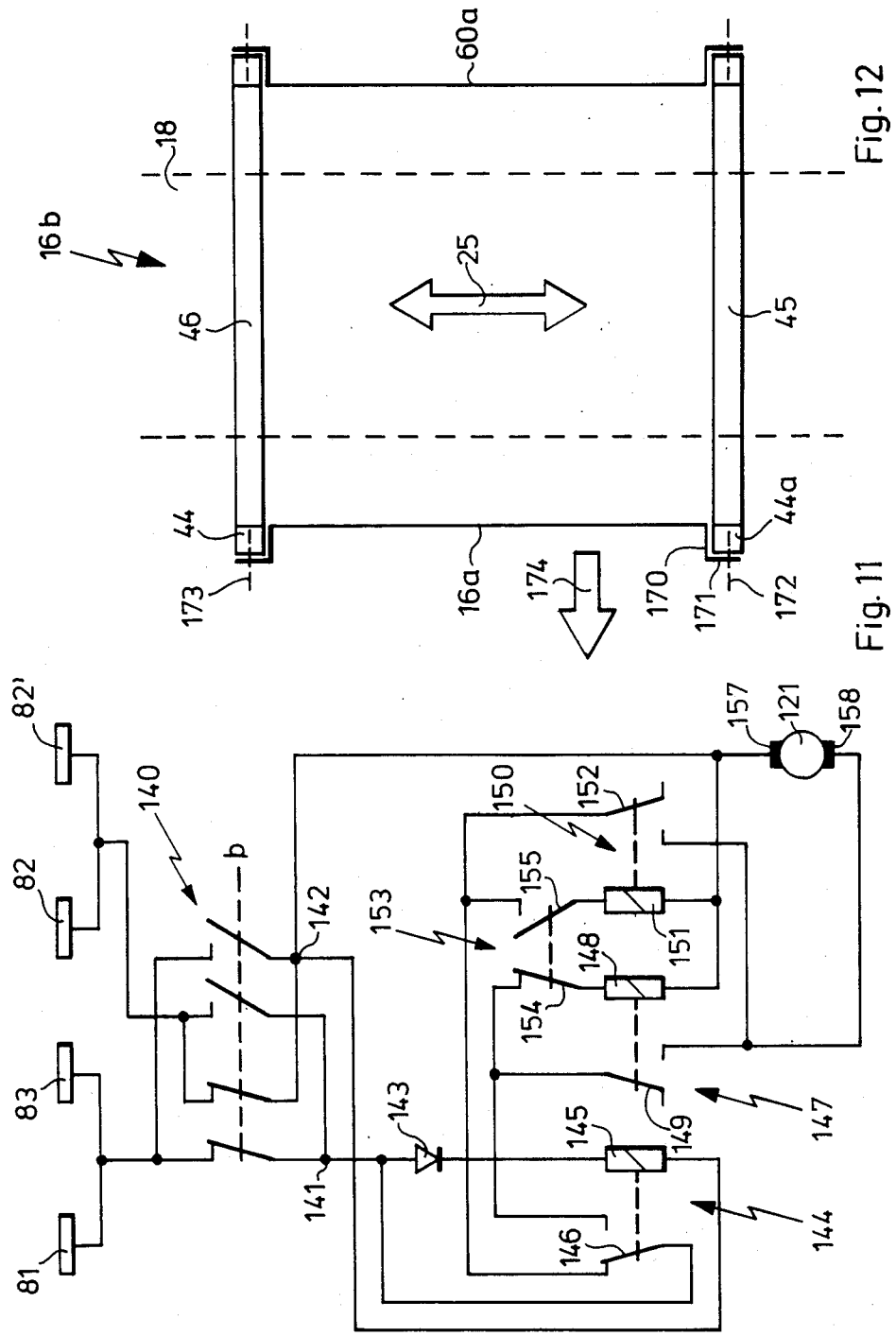

SYSTEM FOR EXHAUSTING AND COLLECTING GASES, IN PARTICULAR MOTOR VEHICLE EXHAUST GASES IN ASSEMBLY OR FACTORY HALLS

The present invention relates to a system for exhausting and collecting gases, in particular motor vehicle exhaust gases in assembly or factory halls, comprising a slotted exhaust conduit fixed in position and provided on one face with an elastic, axial lip seal for guiding in sealed relationship a suction nozzle of at least one carriage which can be moved in the axial direction along guide sections, wherein the suction nozzle is connected to a hose and a vacuum is generated in the slotted exhaust conduit through an exhauster. A system of this type has been known before from German Pat. Specification No. 28 55 325.

Systems of this type are used for exhausting and collecting gases and exhaust gases where the gas or exhaust gas is to be extracted from a point which changes its position within an assembly or factory hall or the like. Typical applications for such installations are found, for example, in final assembly halls of motor vehicle manufacturers. For, the engines of the motor vehicles are in operation already during the final assembly and inspection so that exhaust gases are emitted from the exhaust pipes of the motor vehicles. At the same time, the motor vehicles are moved through the hall along a conveyor belt. In view of the fact that it would be very costly and, moreover, dangerous, to let the exhaust gases escape first into the hall and to extract them thereafter from the whole space, one connects the hose directly to the exhaust of the respective motor vehicle, using a suitable hose nozzle and clip, and causes the carriages to move along the slotted exhaust conduit as the motor vehicle is moved by the belt. At the end of the belt, the hose is detached from the exhaust, and the carriage is returned by suitable return means to the beginning of the belt. During the return motion, the hose is normally raised by a hose lift so as to prevent any risks of damage through the swinging hose during the return motion of the carriage.

Systems of this type for use with motor vehicles may be employed also in halls where operating tests are carried out on motor vehicles, as for example at bus depots and repair stations, technical control associations or the like. In these cases, the motor vehicle is also moved within a space that may be closed to a greater or lesser degree, for example for performing axle-to-axle braking tests, and the installation described before permits the exhaust gases to be extracted directly at the point where they are generated.

It goes, however, without saying that the application of installations of this type is by no means restricted to the extraction of motor vehicle exhaust gases but that instead other gases or exhaust gases, including vapors or the like may also be exhausted, just as gases containing fixed suspended particles, such as air mixed with dust, wood chips or the like.

The before-mentioned system known from German Patent Specification No. 28 55 325 comprises a carriage provided at its upper portion with rollers guided in a guide section which is formed integrally with the slotted exhaust conduit.

The carriage is entrained by the moving object, for example the motor vehicle which is displaced by the conveyor belt. As mentioned before, transposition means are required at the end of the belt for transferring the carriage to a return track by which it is returned to the beginning of the belt. In known systems of the described type, a chain conveyor is used for this purpose on which the carriage is mounted by the transposition means and detached again—when the beginning of the conveyor belt has been reached—and returned to the beginning of the assembly belt by a second transposition means.

Thus, it is a drawback of the known system that the movement of the carriage depends fully on external transport means, i.e. the motor vehicle moved by the conveyor belt, the transposition means and the chain conveyor of the return track. This may give rise to diverse problems.

For example, if the carriage hits against a mechanical obstruction on its way along the assembly belt, for example in the form of dirt in the guide sections of the slotted exhaust conduit, this resistance has to be overcome by the pulling motor vehicle via the hose. This may under certain circumstances lead to the hose nozzle coming off the exhaust pipe of the motor vehicle and, thus, exhaust gases escaping in an uncontrolled manner. Further, relatively complex transport means are required in the area of the transposition means, for example a long-stroke pneumatic cylinder whose movement must be exactly tuned to that of the chain conveyor and which, consequently, constitutes an additional potential source of trouble.

An important drawback is, however, to be seen in the fact that when the assembly belt is charged irregularly, carriages may "pile up" in the area of the return track if the number of carriages taken off for arriving motor vehicles at the beginning of the conveyor belt is smaller than the number of carriages arriving from the chain conveyor via the return track. Considering that normally objects mounted on a chain conveyor are rigidly connected therewith, such "piling-up" will give rise to problems because a finite buffering capacity is available only in the area of the transposition means. On the other hand, it is, however, not possible to let some of the carriage be entrained empty because there is no motor vehicle in the gap that could be used to pull them.

Now, it is the object of the present invention to improve a system of the type described before in such a manner that the conveying problems in the area of the return track, but also in the area of the slotted exhaust conduit and the transposition means, are reduced considerably.

This objective is achieved according to the invention in that the carriage is provided with a drive motor whose power take-off shaft is provided with a wheel arranged for engaging the guide section and that the flux of force between the drive motor and the guide section can be closed and interrupted, respectively, by a coupling element switchable by electric means. The invention solves the underlying problem in this manner perfectly because it permits the carriages to move autonomously thanks to their own drive, in all areas of the system, i.e. in the area of the slotted exhaust conduit as well as in the area of the transposition means and the return track. At the same time, the carriages may be stopped at any point of the system by interrupting the flux of force between the motor and the guide section, and the carriage may also, just as in the case of the known systems, be moved easily by pulling the hose because the drive motor does not act as a brake, thanks to the interruption of the flux of force.

It is, therefore, possible to cause the carriage to follow the movement of the belt by its own force so that no pulling forces have to be exerted upon the hose and there is no risk that the hose may get detached unwantedly from the exhaust pipe of the motor vehicle. Depending on the existing surrounding conditions, the transposition means may either be provided in the conventional manner with separate conveying means, for example in the form of the long-stroke pneumatic cylinder mentioned before, or be designed in such a manner, for example in the form of a semi-circular bend, that it can be passed by the carriage by its own force. The bend may be directly followed by the return track through which the carriage is likewise moved by its own force. Thanks to the electrically switchable coupling element, no problems will arise even when the assembly belt is charged irregularly, because an desired number of carriages may be "parked" in the area of the return track or the transposition means at the end of the return track and sent to the conveyor belt as required, by closing the flux of force and switching on the drive motor.

It will be readily seen that the system according to the invention is particularly well suited for being used as part of a computer-controlled system, for example in fully-automated assembly or factory facilities, because all processes can be centrally controlled, except for the fitting of the hose which is not improved by the present invention.

In a preferred embodiment of the invention, the wheel is designed as a friction wheel.

Although other possible drive mechanisms—such as gear wheels or wire rope drives—may likewise be used with advantage within the framework of the present invention, it is an additional advantage of the friction wheel that it can perform the function of a coupling element in a particularly simple manner, by mere displacement, and can be moved into and out of its active position at practically any desired point. In addition, a friction wheel constitutes a particularly simple and, thus, low-cost transport device.

According to a further embodiment of the invention, the carriage comprises a frame composed of stirrups with sections lying in a plane extending in parallel to the longitudinal axis of the slotted exhaust conduit, the sections of two stirrups being provided with a detachable first mounting plate and the drive motor being provided on the said first mounting plate.

This measure provides the essential advantage that devices already in operation can be re-fitted, it being only necessary to mount the first mounting plate with the drive motor and the necessary control means on the sections of the stirrups which are known as such. The system according to the invention facilitates also the performance of maintenance work because only the mounting plate with all drive and control means fixed thereon has to be exchanged if this should become necessary. This is a particularly important aspect of the system according to the invention because no extended down-times due to breakdowns of operational devices can be allowed in industrial assembly or factory halls. It is, therefore, of particular importance that even personnel not fully acquainted with all the details of such devices must be in a position to carry out repairs quickly, and it is a particularly advantage in this case if there is no need to exchange the whole carriage, but if instead only the mounting plate and the before-mentioned components have to be replaced.

In a further embodiment of the invention, the position of the drive motor relative to the guide section can be varied by means of an electromagnet.

This measure, too, offers the advantage of a particularly simple structure of the device because the drive motor can be pivoted together with the wheel or friction wheel mounted thereon; thus, there is no need to provide additional couplings, or the like, between the motor and the wheel. And an electromagnet is, in addition, easy to switch electrically and offers high operating safety so that the flux of power can be controlled in a simple and safe manner by control signals.

In a further preferred embodiment of the invention, the drive motor is arranged on a lever which pivots about a joint and one arm of which can be brought into operational contact with the electromagnet.

This measure provides the advantage that the movement of the drive motor for opening and closing the flux of force is a simple pivoting movement which can be performed over relatively short distances and without any risk of tilting.

It is particularly preferred in this connection that the first mounting plate extends in parallel to the longitudinal axis of the slotted exhaust conduit and is provided with a flange directed away from the guide section arranged in the immediate vicinity of the slotted exhaust conduit, that the free end of the flange is provided with a hinge carrying a lever plate which points towards the slotted exhaust conduit and the free end of which is engaged by an actuating rod of the electromagnet which is likewise mounted on the mounting plate, and that the drive motor is held on a further mounting flange provided on the lever plate.

This embodiment is particularly advantageous insofar as it permits the required movements of the drive motor to be implemented by a minimum of components. Moreover, the dimensions and triggering of the electromagnet can be adapted conveniently to the required movements and, above all, to the weights of the transport devices by selecting lever arms. of suitable lengths.

A particularly favorable effect is achieved in this embodiment if the lever plate is lifted when the flux of power is closed.

For, this measure provides the advantage that in the rest position the lever plate is lowered and, thus, the flux of power is interrupted because the drive motor and the friction wheel are moved away from the guide section by gravity. Consequently, in the de-energized condition of the electromagnet, the carriage may be moved with a minimum of friction either by hand or by the transport device of the transposition means or else by pulling at the hose as in the case of the known systems. Lifting of the lever plate and, thus, energizing the electromagnet is necessary only when the carriage is moved by its own force—and these travelling times are much shorter, relatively. This helps not only to reduce wear, but also to increase the operating safety substantially.

In one embodiment of the invention, an electric switching device is provided for controlling the drive motor and the electrically switchable coupling element.

Such a switching device permits all transport functions of the carriage to be controlled centrally, i.e. not only the drive motor itself, but also the coupling element. The electric switching device may be equipped with a plurality of inputs so that the drive control of the carriage can be adapted to the particular conditions of application of the device.

The electric switching device may, for example, initially decelerate the carriage by de-energizing the drive motor so that the latter acts as a brake. Once the carriage has come to a standstill, the electromagnet may be de-energized so that the flux of force is fully interrupted and the carriage can be moved in the manner described before, only against the rolling friction of its rollers.

In one embodiment of this example, the switching device is coupled with a proximity switch which acts in the travelling direction of the carriage and actuates at least the coupling element when the carriage approaches an obstruction.

This measure provides the advantage to eliminate the problems arising when the carriages "pile up" in the area of the return track in the manner described before, because the carriages will stop automatically one after the other maintaining between them a certain minimum distance determined by the proximity switch. When the first carriage of the row is picked up by the transposition means, the other carriages parking in the row will move forward automatically until the pre-determined minimum distances are again obtained between every two of them. This avoids safely any damage due to carriages bumping into each other.

The example just described may be further improved if the proximity switch is of the non-contact type and coacts with a reflecting plate of another carriage travelling ahead of the carriage on which is is mounted.

Compared with mechanical proximity switches, it is an advantage of this arrangement that any mutual contact and, thus, possible damage to the carriage is positively avoided. The response distance of the proximity switches may, for example, be properly selected to ensure that the carriage following in the row can be braked safely without the carriages contacting each other.

In a further embodiment of the example using a switching device, the latter is coupled with an elongation sensor fixed to the hose so that the flux of force is closed when a pre-determined elongation of the hose is exceeded. According to a further variant of the invention, a pendulum switch whose contact arm is deflected in response to the movement of the hose may be provided on the carriage, either instead of the elongation sensor or in addition thereto.

These embodiments are particularly well suited for the control in the area of the assembly conveyor. Instead of being entrained by the motor vehicle moving on the assembly conveyor, the carriage is driven by its own force as long as a pulling force acts on the hose in the lateral direction. The amount of this pulling force may be relatively small so as to reduce the mechanical stress exerted upon the hose, and, above all, to prevent the hose end from detaching unwantedly from the exhaust pipe of the motor vehicle. Being moved by its own force, the carriage may overcome even dirty points of the guide sections without the hose being subjected to higher pulling forces.

In a further embodiment of the invention using a switching device, the latter may, finally, be provided with a radiation transmitter or a radiation receiver, and the free end of the hose may be equipped with a corresponding radiation receiver and/or radiation transmitter so that the flux of force is closed when a pre-determined distance between the free end of the hose and the switching device is exceeded.

This embodiment of the invention is again well suited for use in the area of the assembly belt, the carriage being again moved by its own force to travel beside the motor vehicle, the control being, however, realized in this case by an absolutely contactless light, infrared or ultrasonic device, or the like. The switching device and the corresponding element at the free end of the hose may of course be coded in a suitable manner to exclude any interference with other switching devices.

According to a further improvement of the invention, a hose lift is provided on a second detachable mounting plate at the carriage.

This feature provides the before-described advantages, i.e. easy retrofitting and maintenance, also for the hose lift which as such has been known before.

According to a further embodiment of the invention, the carriage is equipped with collector shoes coacting with contact rails.

As compared with trailing cables or the like, it is an advantage of this arrangement that the carriages can be detached and mounted easily and that, in addition, further control functions can be performed in the manner known as such by a suitable arrangement of the contact rails, for example via sectioning points.

It is particularly preferred in this connection to provide separate collector shoes and separate contact rails for the drive motor, the coupling element and, if necessary, also for the hose lift.

Such an arrangement offers the advantage that on the one hand the individual units can be operated at different rated voltages, i.e. the voltage most suited for each of them. In addition, different control functions can be realized for the individual units by giving the collector shoes or the contact rails a corresponding suitable geometry.

According to a variant of this embodiment, the hose lift is provided with a drive consisting of a d.c. motor, and the contact rails which are arranged in pairs comprise first sections where the operating voltage has a first polarity for winding up the hose and second sections where the operating voltage has a second polarity for unwinding the hose.

The advantage of this arrangement is to be seen in the fact that winding and unwinding of the exhaust gas hose is effected automatically, without any additional switching arrangements, at the points of the system where the hose lift is to be operated in the described manner.

A particularly preferred practical embodiment of such a system is characterized in that a first terminal of the motor is permanently connected with the collector shoes of the one rail of the pair of contact rails and that the second terminal is connected with two switching sections that can be controlled via an alternately operable pair of limit switches provided on the motor, the said switching sections being arranged for being connected with the collector shoes of the other rail via a change-over switch which is operated in response to the polarity present at one of the rails.

This arrangement offers the advantage that winding and unwinding of the exhaust gas hose is effected fully automatically upto a pre-determined end position, the change-over switch ensuring that the polarity of the operating voltage is changed over at the motor terminals everytime the winding direction is reversed.

In a particularly preferred arrangement of this type, the change-over switch is operated via a diode connected with one of the rails.

The advantage of this feature lies in the fact that the polarity of one of the rails can be detected without any mechanically operated elements so that the diode is rendered conductive to operate the change-over switch in the presence of the pre-selectable polarity.

A favorable effect is achieved when wiper motors are used as drive motors and/or motor for the hose lift and low voltage is applied to the contact rails.

It is a particular advantage of this measure that wiper motors are very sturdy servomotors which in addition comprise a reduction gear providing a power take-off speed in the range required for the present application. And the torque required for driving the carriage and/or lifting the hose is also provided by wiper motors. Finally, such wiper motors operate at low voltage, normally 12 Volts or 24 Volts. This low voltage may be distributed through the contact rails safely and without the need to provide costly insulations or to observe certain minimum spacings.

In a further embodiment of the invention using collector shoes, the carriage is provided with two such shoes placed one behind the other in the travelling direction.

The advantage of this measure lies in the fact that sectioning points and joints existing for example between the slotted exhaust conduit and/or the return track and the transposition means, can be passed without any difficulty.

Preferably, the collector shoes have their one ends interconnected by means of a spring and their respective opposite ends arranged to pivot laterally, relative to the travelling direction.

It is advantageous in this arrangement that it permits a resilient deflection movement vertical to the travelling direction so that the collector shoes will in any case enter safely a receiving fork of the contact rail even if the carriage should roll a little due to the travelling movement or if extended operation should have led to wear or certain displacements.

The collector shoes may according to the invention be designed also to permit pivoting in the vertical direction so that they can be deflected either for maintenance purposes or else for being disengaged from the contact rails.

In a further embodiment of the invention, the first mounting plate carrying the drive motor, the coupling element and the associated collector shoes and contact rails is arranged on one side of the carriage, while the second mounting plate carrying the hose lift and the associated collector shoes and contact rails is provided on the other side of the carriage.

It is a particular advantage of this arrangement that the overall structure of the carriage is rendered particularly compact because the necessary drive and control elements are distributed over the two sides of the carriage so that the overall size of the structure, i.e. the width by which it projects on both sides, is reduced to a minimum. In addition, it is in the interest of easy exchangeability that the two mounting plates can be detached independently of each other without the need to remove the other group of elements simultaneously. The arrangement of the contact rails on both sides of the carriage finally offers the advantage of avoiding an accumulation of many contact rails on one side of the carriage and, thus, of preventing the collector shoes from entering a wrong contact rail.

A particularly favorable effect is provided in this case by the fact that the mounting plates are screwed laterally to the outside of the carriage.

Thanks to this measure, the whole drive unit and/or the whole hose lift can be screwed to the carriage from the outside, for example for repair purposes.

Finally, there is still another preferred embodiment of the invention in which the slotted exhaust conduit extends along the side of a return track which have their respective ends interconnected by transposition means or guide section bends, and in which at least the return track is provided with contact rails for the drive motor and the coupling element and at least the transposition means and/or the bends are provided with contact rails for the hose lift and, if necessary, also for the drive motor and the coupling element.

It is a particular advantage of this arrangement that a minimum number of contact rails is provided only and that a self-propelled movement of the carriages is rendered possible by the system only in those areas where such movement is actually required in a system of simple design.

Other advantages of the invention will become apparent from the following description and the attached drawing.

It goes without saying that the features which have been described before and which will be mentioned hereafter are regarded as inventive not only in the described combination, but also individually or in any other combination.

Certain embodiments of the invention will be described hereafter in detail with reference to the drawing in which:

FIGS. 3 and 4 show a front and a side view, respectively, of the carriage according to FIG. 1, illustrating certain additional details of the invention;

FIG. 8 is a diagrammatic representation of the distribution of the contract rails in the system shown in FIG. 1;

FIG. 9 is a diagrammatic representation of two embodiments of carriage controls employed in a system of the type shown in FIG. 1;

FIG. 10 shows a variant of a control of the type shown in FIG. 9.

FIG. 11 is a circuit diagram illustrating one embodiment of a hose lift control;

FIG. 12 is a diagrammatic plan view of one embodiment of a carriage illustrating the function of easily detachable mounting plates.

Figure 1:
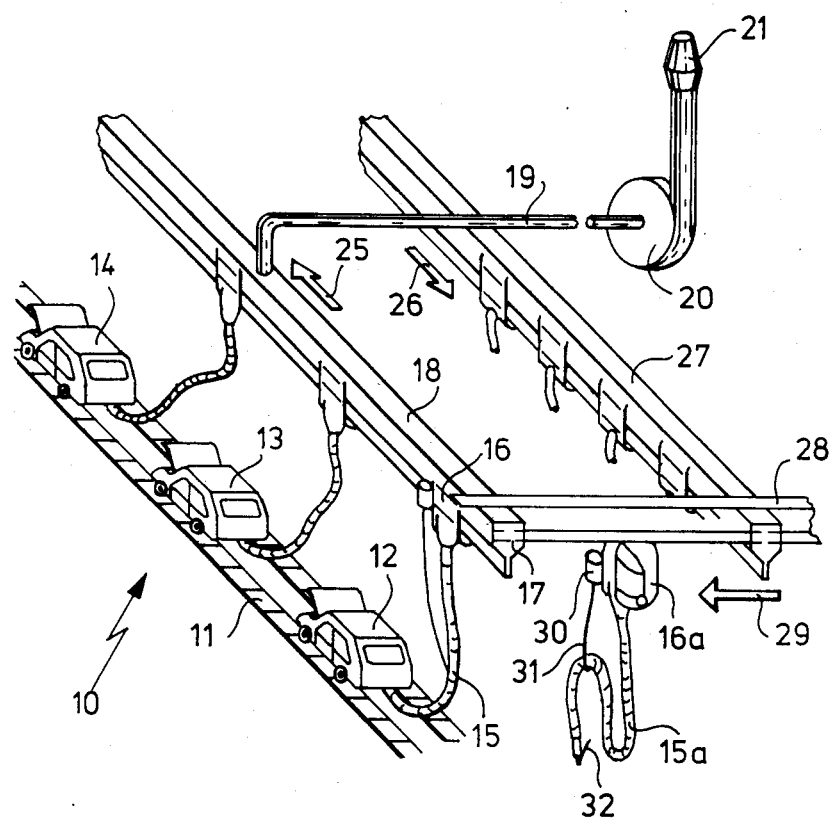
FIG. 1 is a perspective general view of a system according to the invention, for use in an assembly hall.

In FIG. 1, which shows a perspective general view of a final assembly system of the type used in motor vehicle factories, the overall system is designated by the reference numeral 10. Motor vehicles 12, 13, 14 are fed slowly on a conveyor belt 11 through a factory hall while fitters are performing adjusting and testing work on the vehicle. The engines of the motor vehicles 12, 13, 14 must be kept running while this work is being performed. The exhaust systems of the vehicles 12, 13, 14 are, therefore, connected to exhaust gas hoses 15 leading each to a carriage 16. The carriages 16 run on a slotted exhaust conduit 18 enclosing a cavity 17 and connected via a central suction system 19 to an exhauster 20 feeding the exhaust gases into a chimney 21.

The belt 11, with the vehicles 12, 13, 14 placed thereon, moves in the direction indicated by arrow 25. At the end of the belt 11, the carriages 16 are transferred by means not shown in the drawing to a return track 27 along which they move in the direction indicated by arrow 26. At the end of the return track 27, there are provided transposition means 28 which may, for example, comprise a pneumatic long-stroke cylinder. The carriages, represented in FIG. 1 by one carriage 16a, are returned to the beginning of the slotted exhaust conduit 18, which may coincide with the beginning of the belt 11, along a path indicated by arrow 29.

On the carriage 16a, a hose 15a and a hose lift 30 comprising a rope 31 can be seen, which serves to lift the hose 15a into a raised position in which the carriage can be displaced without any risk of damage caused by a swinging hose. At the end of the hose 15a, an exhaust nozzle 32 with clamping claw can be seen.

While the carriage 16a is moved by the transposition means 28 towards the beginning of the slotted exhaust conduit 18, the hose lift 30 is operated to lower the hose 15a. Now, the worker mounts the free end of the hose 15a on the exhaust pipe of the motor vehicle, using the exhaust nozzle 32 and the clamping claw. The motor vehicle is now displaced by the conveyor belt 11 in the direction of arrow 25; the carriage 16a may be trailed by the pulling force exerted on the hose 15a. At the end of the slotted exhaust conduit 18, there is provided a control rail not shown in FIG. 1 which shifts a lever provided on the carriage 16a. This lever acts on the one hand to release the clamping claw at the exhaust nozzle 32, via a Bowden cable, and on the other hand to operate the hose lift 30 via a switch so that the hose 15a will assume the retracted position shown in the drawing while the carriage is transferred, returned and then again transferred to the beginning of the belt.

Figure 2:
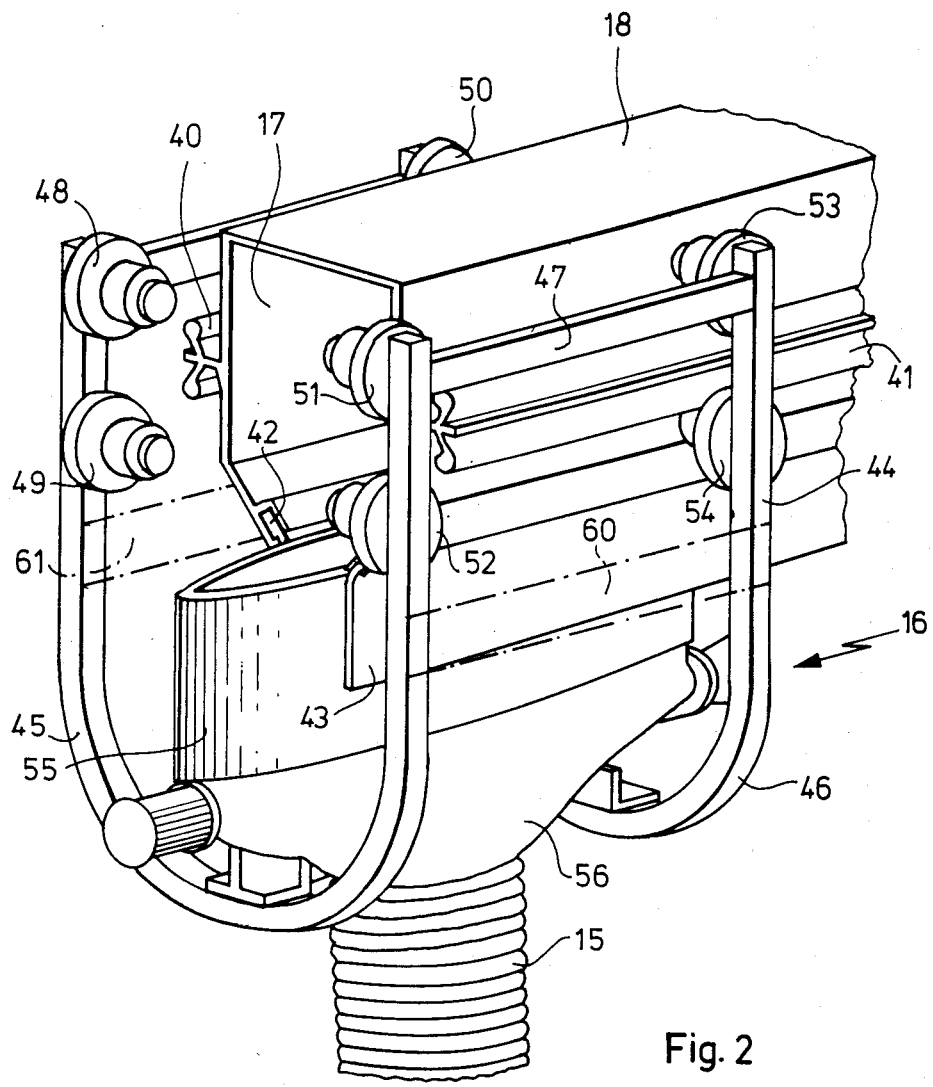
FIG. 2 is a perspective view of one carriage of a system according to FIG. 1.

FIG. 2 shows the details of the carriage 16 on a slotted exhaust conduit 18 in perspective representation.

It can be seen that a guide section 40, 41 is formed integrally with each of the sides of the slotted exhaust conduit 18 enclosing the cavity 17. An upper, substantially box-shaped section of the slotted exhaust conduit 18 opens downwardly and ends in this area in two elastic lip seals 42, 43 extending along the longitudinal axis of the slotted exhaust conduit 18.

The carriage 16 comprises at its front and rear end faces one U-shaped stirrup 45, 46 each. The stirrups open upwardly and comprise vertical lateral sections 44 which are interconnected by struts 47 in the area of the free ends of the stirrups 45, 46. The vertical sections 44 carry on the inner sides of the stirrups 45, 46 rollers 48, 49, 50, 51, 52, 53, 54. These rollers are arranged in such a manner that each stirrup 45, 46 is provided on each of its free ends with one pair.of such rollers 48, 49; 50; 51, 52; 53, 54 and that each such pair embraces one of the guide sections 40, 41.

A suction nozzle 55 of lenticular shape (viewed in the longitudinal direction of the slotted exhaust conduit 18) and made preferably of stainless steel is arranged in the curved portions of the stirrups 45, 46. This suction nozzle 55 is in intimate contact with the elastic lip seals 42, 43 so that the slotted exhaust conduit 18 is sealed off tightly in downward direction over its full length and losses due to leakage are reduced to a minimum. The suction nozzle 55 ends at its bottom in a molded part 56 consisting preferably of cast light metal. The molded part 56 ends in turn in the hose 15.

It appears clearly that the carriage 16 can move along the guide sections 40, 41, guided by the rollers 48 to 54, with the hose 15 remaining at any time tightly connected with the slotted exhaust conduit 18 via the suction nozzle 55.

The system shown in FIG. 1 and the carriage shown in FIG. 2 are known as such to the extent described before. In the known arrangements, the carriages 16, 16a can be moved only through external transport means, i.e. in the area of the belt 11 by trailing through the motor vehicles 12 to 14, in the area of the transposition means 28 by other auxiliary means, and in the area of the return track 27 by special conveyor means, such as chain conveyor.

Now, according to the invention, the carriage 16 shown in FIG. 2 is provided in the area of the sections 44 on its one side with a first mounting plate 60 and on its opposite side with a second mounting plate 61 by means of which transport and other devices can be fastened on the carriage 16 in an easily detachable manner.

FIGS. 3 and 4 show first inventive details of this arrangement, FIG. 4 showing a side elevation of the arrangement of FIG. 3.

One recognizes in FIG. 3 immediately the before-mentioned first mounting plate 60 and the second mounting plate 61. On the side of the second mounting plate 61 which—as will be described in detail further below in connection with FIG. 7—serves for fastening the hose lift 30, a two-armed lever 64 arranged to pivot about an axis 63 is provided at the upper free end between the stirrups 45, 46. The lever 64 comprises a long arm 65 and a short arm 66, as can be seen best in FIG. 4. The end of the short arm 66 carries a pin 67 with a Bowden cable 72 fastened thereon for operating the clamping claw at the exhaust nozzle 32. The Bowden cable passes through a first eye 68 arranged laterally on the stirrup 45.

The free end of the long arm 65 carries a roller 73 moving together with the carriage 16 as the latter travels in the direction indicated by arrow 74. At the end of the belt 11, the roller 73 runs upon an inclined control rail 75 so that the long arm 65 is turned downwardly in the direction indicated by arrow 76. Consequently, a pulling force is exerted by the short arm 66 upon the Bowden cable 72 so that the clamping claw of the exhaust nozzle 32 is released in the manner described before.

An additional guide eye 71 for the rope 31 of the hose lift 30 is provided in a holding plate 70 projecting laterally from the second mounting plate 61.

According to the invention, the mounting plates 60, 61 are mounted detachably on the stirrups 45, 46 by screws 77, as indicated in FIG. 4. Accordingly, all mechanical and electric units can be easily detached from the carriage 16, simply by loosening the screws 77, except for the elements described before, namely the lever 64, the eye 68 and the holding plate 70 with the guide eye 71. A variant of the mounting plates 60, 61 is shown in FIG. 12.

The mechanical and electric units of the transport device of the carriage 16 will now be described in detail with reference to FIGS. 5 and 6.

Figure 5:
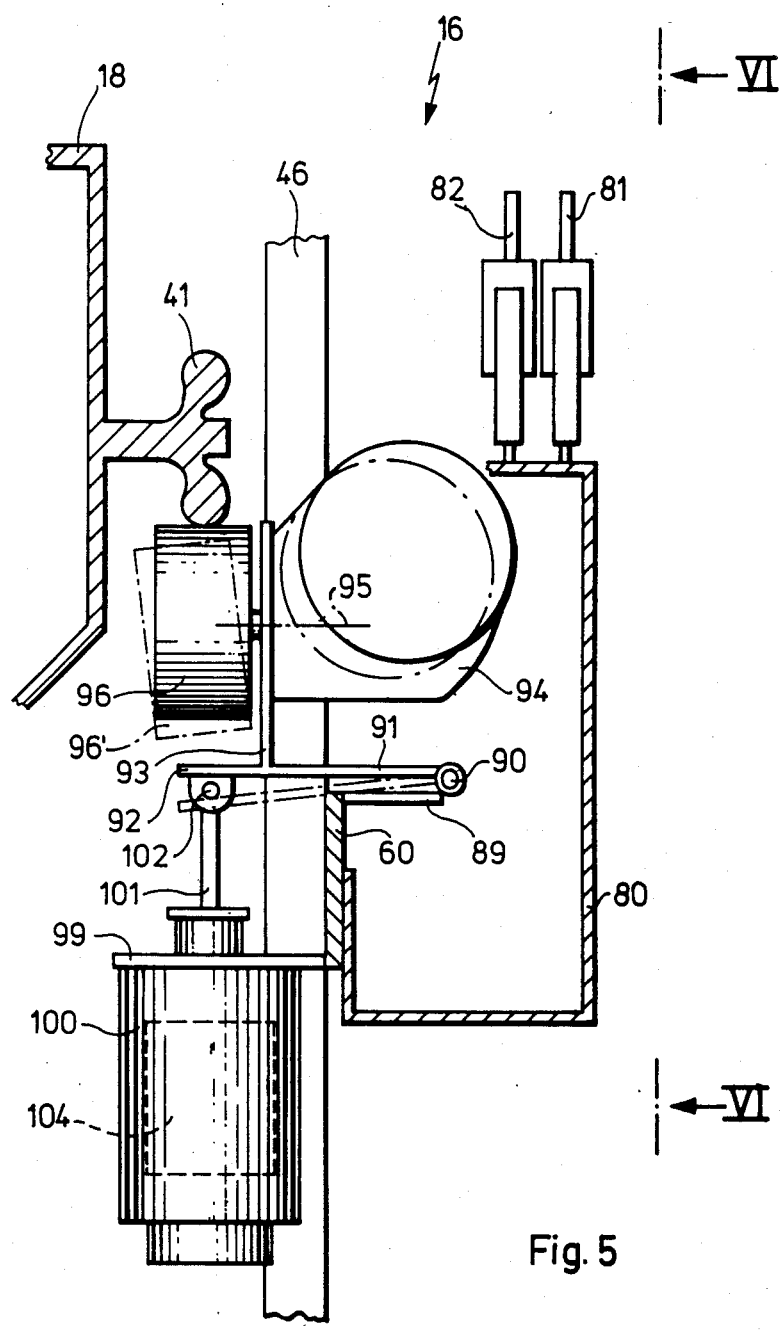
FIG. 5 is a sectional view of FIG. 3, in enlarged scale, showing further details of the invention.
Figure 6:
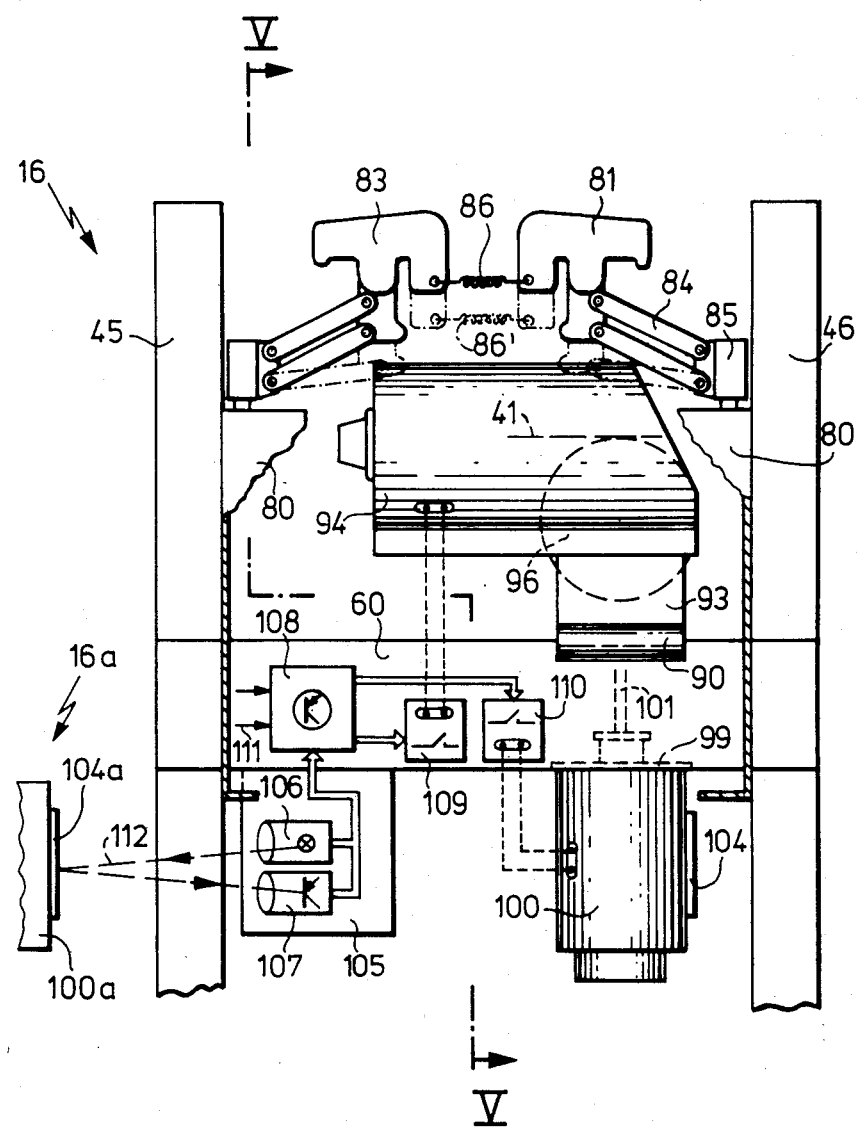
FIG. 6 shows the elements of FIG. 5, in side elevation.

The units mentioned before are practically fully enclosed by a protective housing 80 of which only a few portions are shown in FIGS. 5 and 6. The housing 80 carries on its upper face collector shoes 81, 82, 83. In the embodiment shown, two such collector shoes 81, 82 are arranged side by side, viewed in the travelling direction, and two such pairs 81, 82; 83 are arranged one behind the other, also viewed in the travelling direction. The collector shoes 81 to 83 are mounted on rotary joints 85, via parallelogram guides 84, so that they are movable both in vertical direction and laterally—viewed in the travellrng direction. The rotary joint 85 are arranged on outwardly pointing ends of the collector shoes 81 to 83 which have their opposite ends facing each other and linked by a spring 86. Thus, the lateral deflection movement permitted by the rotary joints 85 is limited resiliently, and the collector shoes 81 to 83 are returned by the spring 86 automatically to the position in which they are aligned with each other—viewed in the travelling direction.

The position occupied by the collector shoes 81 to 83 when they are lowered by the parallelogram guides 84 is indicated in FIG. 6 by broken lines.

The elastic coupling of the collector shoes 81 to 83 by means of a spring 86 provided for each pair of parallel collector shoes 81, 83 ensures that no excessive stresses are encountered at the collector shoes 81 to 83 even in the case of relative movements between the carriage 16 and the contact rails which will be described in detail further below. In addition, this arrangement facilitates the entry of the collector shoes in contact rails, at the beginning of a track provided with such contact rails as well as in the area of sectioning points. A more detailed description of this situation will be given further below in connection with FIG. 8.

As can be seen best in FIG. 5, the first mounting plate 60 is provided at its upper end with a flange 89 pointing laterally away from the slotted exhaust conduit 18 and carrying on its free end a hinge 90 whose second hinged part carries a lever plate 91 extending—in the position shown in full lines in FIG. 5—substantially parallel to the flange 89, with its free end 92 pointing in the direction of the slotted exhaust conduit 18. A mounting flange 93 extending vertically upwardly from the central area of the said lever plate 91 serves as mounting support for a drive motor 94, preferably a wiper motor. The power take-off shaft 95 of the said drive motor passes through the mounting flange 93 and carries on its free end a friction wheel 96.

The lower end of the first mounting plate 60 is provided with an additional flange 99 extending laterally towards the slotted exhaust conduit 18. This additional flange 99 carries an electromagnet 100 whose operating rod 101 extends upwardly and engages a joint 102 provided on the free end 92 of the lever plate 91. Alternatively, the upper end of the operating rod 101 may be spherical in shape and be in loose contact with the lower face of the free end 92.

In the position of the lever plate 91 shown in FIG. 5 in full lines, the electromagnet 100 is in its excited condition in which the operating rod 101 is extended upwardly and urges the friction wheel 96 against the guide section 41 via the arrangement described before. In the deenergized condition of the drive motor 94, the latter acts as a brake, while in the energized condition the carriage 16 is moved by the force of the drive motor 94 along the longitudinal axis of the slotted exhaust conduit 18.

Now, when the electromagnet 100 is deenergized, the weight of the individual components, in particular the drive motor 94, will cause the lever plate 91 to drop into the position indicated by broken lines in FIG. 5, until either the operating element of the electromagnet 100 comes to rest against a stop not shown in FIG. 5, or the lever plate 91 gets into contact with the upper edge of the first mounting plate 60. As can be seen very well, the friction wheel 96' is separated in this position from the guide section 41 so that the flux of force between the drive motor 94 and the said guide section 41 is interrupted. The carriage 16 cannot be moved in this position in the conventional manner along the slotted exhaust conduit 18 because the rollers 48 to 54 are still retaining it on the guide section 41.

When the electromagnet 100 is energized again, the travelling movement of the carriage 16 is braked when the drive motor 94 is switched off, or accelerated when the drive motor 94 is switched on.

As can be seen best in FIG. 6, an electric switching device 108 is arranged on the first mounting plate 60 for controlling the drive functions.

In one embodiment of the invention, the electromagnet 100 which projects downwardly well beyond the first mounting plate 60 carries on its rear face—viewed in the travelling direction—a reflecting plate 104. A mounting plate 105 carrying a light transmitter 106 and a light receiver 105 projects downwardly from the first mounting plate 60 at the forward end of the carriage 16, viewed in the travelling direction. When the carriage 16 approaches a carriage 16a travelling ahead, or a stopping carriage 16a, a light beam 112 emitted by the light transmitter 106 is reflected by the reflecting plate 104a mounted on the electromagnet 100a of the said carriage 16a, and received by the receiver 107. The transmitter 106 and the receiver 107 are connected actively with the switching device 108, as shown in FIG. 6. Now, when the distance to a preceding carriage 16a or another stationary or moving obstacle becomes smaller than a predetermined minimum distance, a first relay 109 may, for example, be actuated to deenergize the drive motor 94. The drive motor 94 now acts as a brake until a second relay 110 is actuated by the switching device 108 shortly thereafter to deenergize the electromagnet 100. The electromagnet 100 interrupts the flux of force to the guide section 41 in the manner described in connection with FIG. 5 so that the carriage is stopped smoothly at a pre-determined distance from a preceding carriage 16a.

If, thereafter, the distance to the preceding or stopping carriage 16a increases again, for example because the carriage is transferred by the transposition means 28 from the area of the return track 27 into the area of the slotted exhaust conduit 18, then this circumstance will be detected by the proximity switch formed by the elements 106, 107, and the drive motor 94 is coupled and switched on again by successive or simultaneous operation of the relays 109, 110 so that the carriage 16 can continue its travel.

It goes without saying that other wireless proximity switches or contact switches may be used also instead of the optical proximity switch.

As can be further seen in FIG. 6, the switching device 108 is provided with external inputs 111 to permit additional control functions to be performed, such as those described further below in connection with FIG. 9.

Figure 7:
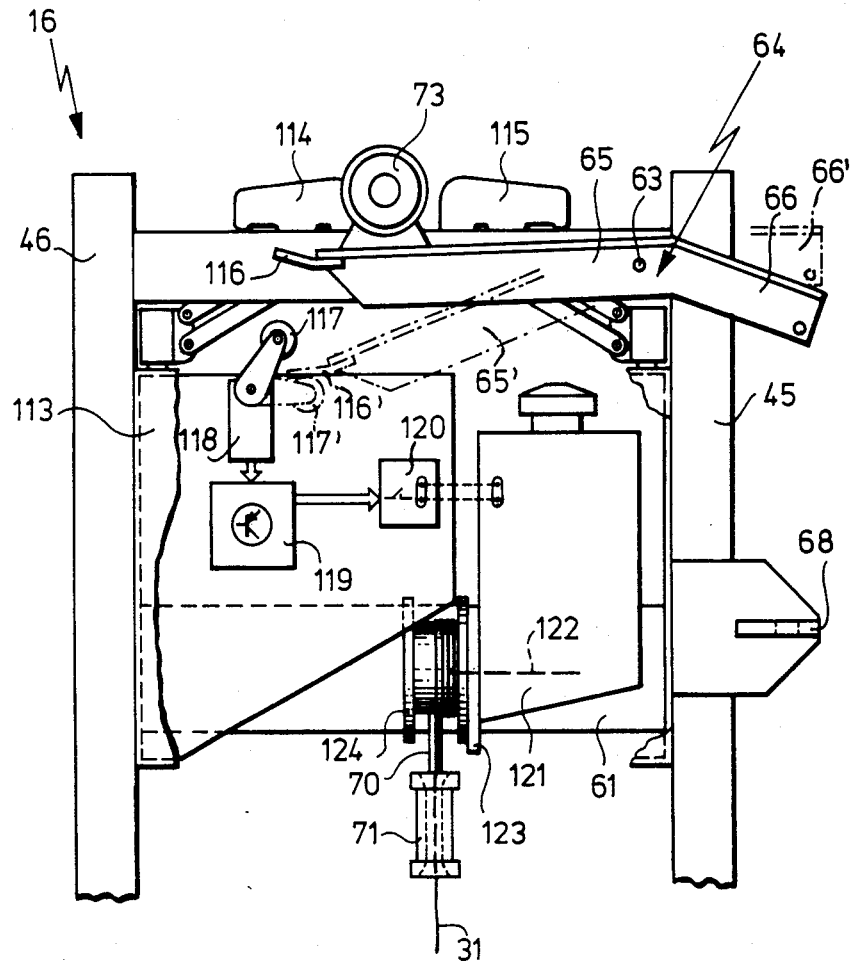
FIG. 7 is a representation similar to that of FIG. 6, but showing the other side of the carriage.

We are now going to describe the mechanical and electric components of the hose lift 30 with reference to the details of FIG. 7:

Just as described before in connection with FIGS. 5 and 6, the second mounting plate 61 serves as a supporting element for the components of the hose lift 30 which, therefore, can be detached from the stirrups 45, 46 as one unit, by loosening the corresponding mounting screws.

The essential components are enclosed in a housing 113 broken away in FIG. 7. Again, two pairs of collector shoes 114, 115 are provided on the upper face of the housing in the manner described before.

The long arm 65 of the two-armed lever 64 is provided with a switching reed 116 which during normal travel of the carriage 16 remains in its position shown in full lines in FIG. 7. To this end, a return spring is provided which is, however, not shown in detail in FIG. 7. As has been explained before in connection with FIG. 4, the two-armed lever 64 is pivoted downwardly into the position shown in broken lines in FIG. 7 when the carriage gets into contact with a control rail 75.

A roller 117 of a switching arm of a switch 118 is arranged within reach of the switching reed 116. In the deflected condition 65' of the long arm 65, the switching reed 116' urges the roller 117' into the position shown in broken lines and operates in this manner the switch 118. An electric switching device 119 then triggers a relay 120 which in turn switches on a drive motor 121, for example a wiper motor. The drive motor 121 is supported by a mounting flange 123 extending laterally from the second mounting plate 61. A power take-off shaft 122 of the drive motor 121, which in FIG. 7 is shown diagrammatically only, passes through the mounting flange 123 and carries on its free end a drum 124 for winding up the rope 131, and a flange-mounted limit switch for limiting the lifting movement of the hose. FIG. 7 shows the circuit diagram of a variant of the switching device 119.

Hereafter, the manner in which the current is collected for supplying the electric units of the carriage 16 will be described in detail with reference to FIG. 8 and by way of the example of a final assembly installation as indicated at 10 in FIG. 1.

There will be seen in FIG. 8 first of all the slotted exhaust conduit 18 and the return track 27 which extend in parallel to each other and on which the carriages are moving in opposite directions. At the end of the slotted exhaust conduit 18, there is provided on the right-hand side a first contact rail 130 ending in a second contact rail 132 via a sectioning point leading to rear transposition means 131. A third contact rail 133 is provided correspondingly on the left side in the area of the transposition means 131. Because of the parallel arrangement of the contact shoes 81, 82 (see FIG. 5), there may be more than one of such contact rails 133, as indicated at 133a. Regarding now the return track 27 in opposite direction, there is indicated on the right side a fourth contact rail 134 ending in a contact rail 135 in the area of the forward transposition means 28. A sixth contact rail 136 is provided at this point on the left side.

The contact rails are provided with forks 137 at the entry and exit ends of the contact rails, in particular at the sectioning points, as indicated by way of example for the third contact rail 133 in FIG. 8.

When a carriage reaches the end of the slotted exhaust conduit 18, the collector shoes 114, 115 of the right side of the carriage get into engagement with the first contact rail 130, the before-described elastic arrangement of the collector shoes 114, 115 ensuring that the shoes are safely introduced into the fork of the first contact rail 130. This permits the hose lift 30 to be operated at the end of the slotted exhaust conduit 18 and the hose to be lifted after the clamping claw of the exhaust nozzle 32 has been released via the two-armed lever 64 and the Bowden cable 72. Since a certain time is required until the hose is fully lifted, a second contact 132 is provided in the area of the rear transposition means 131 which ensures the continuous current supply of the hose lift 30 also in the area of the transposition means 131.

As soon as the carriage enters the area of the rear transposition means 131, there may be arranged the third contact rail 133 and/or 133a, two contact rails 133, 133a being provided to coact separately with the two pairs 81, 83 and/or 82 of collector shoes arranged in parallel on the drive side.

Now, the carriage 116 may travel through the rear transposition means 131 and/or bend by its own force, by switching on the electromagnet 100 and the drive motor 94, or else it may be transferred by external means, for example a long-stroke pneumatic cylinder. However, once the carriage 16 is aligned with the return track 27, it will move along the latter by its own force, being supplied with the necessary operating voltage for the drive motor 94 and the electromagnet t 100 via the fourth contact rail 134, it being understood that there may of course be provided also two such rails 134. There is no need for a contact rail for the hose lift 30 in this area because the hose is already lifted and does not have to be lowered in this area.

Once the area of the forward transposition means 28 has been reached, the whole procedure is repeated with the exception that now the side of the hose lift 30 is also supplied with voltage via the sixth contact rail 136 so that the hose can be lowered while the carriage is transferred in the area of the forward transposition means 28. The drive units are supplied with the necessary voltage via the fifth contact rail 135 and, if necessary, an additional parallel contact rail so that once the carriage has been transferred it can start travelling by its own force along the slotted exhaust conduit 18. It is, however, also possible to provide a continuous current supply for the drive in the area of the slotted exhaust conduit 18 if the carriage is expected to move by its own force in this area.

FIG. 9 illustrates two embodiments of such a drive in the area of the slotted exhaust conduit 18.

The first embodiment is provided in the area of the hose 15 with an elongation sensor 125 connected with the switching device 108 via one of its external inputs 111. As soon as the motor vehicle 12 is moved by the belt 11 and exerts a pulling force upon the hose 15, this condition is detected by the elongation sensor 125 which causes the drive units of the carriage 16 to drive the carriage 16 forward as long as a tensile stress persists in the hose 15. Accordingly, the tensile stress in the hose may be limited to a very low value.

In a further embodiment according to FIG. 9, which may be used either alternatively or in a suitable combination with the embodiment described before, a transmitter/receiver is arranged at the end of the hose 15, for example on the exhaust nozzle 32, for coacting with a corresponding receiver/transmitter arranged in the area of the switching device 108, for example via a light beam 127, an ultrasonic connection or the like.

The means provided in the area of the switching device 108 on the one hand and the transmitter/receiver on the other hand coact in such a manner that a signal serving to start the drive means of the carriage 16 is released when a certain minimum distance is exceeded.

The carriage 16 thus follows the motor vehicle 12. It goes without saying that the different carriages 16 of the final assembly installation 10 may be equipped with differently coded means in order to exclude an unwanted interference.

FIG. 10 shows a further variant wherein a pendulum switch 130 is arranged on a molded part 56 of the carriage 16. The pendulum switch 130 comprises a joint 131 with a switching arm 132 mounted thereon. The latter ends in a ring 133 embracing the hose 15. Now, when the hose 15 is deflected by a connected motor vehicle in the direction indicated by the arrow, the ring 133 is also entrained so that the arm 132 performs a swinging movement and the pendulum switch 130 responds. The joint 131 may have only one degree of freedom so that the pendulum switch 130 will respond only when the ring 133 is deflected in the sense of movement of the motor vehicle.

FIG. 11 shows a wiring diagram of a variant of the switching device 119 shown in FIG. 7. The driving and switching units are identical to those shown in FIG. 7, except that no switching reed 116 is provided on the two-armed lever 64 and, consequently, no switch 118 and roller 117 are provided. It has been assumed for the purposes of the circuit diagram shown in FIG. 11 that double contact rails are provided as shown in FIG. 8 at 133, 133a. As can be seen clearly for example in FIGS. 5 and 6, each rail of the pair coacts with one pair of collector shoes 81, 83 or 82, 82' arranged one behind the other. The collector shoes are interconnected electrically and connected with switching contacts of a hand switch 140 which can be set to "automatic", "neutral" or "manual operation". FIG. 11 shows the switch in the "automatic" position.

The outputs of the hand switch 140 are connected to a first circuit branch point 141 and a second circuit branch point 142. In the position shown in FIG. 11, the circuit branch point 141 is connected with the collector shoes 81, 83, the circuit branch point 142 with the collector shoes 82, 82'.

The further circuit elements comprise a diode 143, a first relay 144 with exciting winding 145 and change-over contact 146, a second relay 147 with exciting winding 148 and change-over contact 149, a third relay 150 with exciting winding 151 and change-over contact 152, and a limit switch 153 whose switching contacts 154, 155 are switched over in pairs when the drive motor 121 reaches an end position. The terminals of the drive motor 121 are designated by the numerals 157 and 158.

The circuitry and operation of the arrangement of FIG. 5 are as follows:

FIG. 11 shows the relays 144, 147, 150 in their unexcited condition. The limit switch 153 is in the position into which it was switched at the end of the winding process in the upper end position.

For the purposes of the present description we will now assume that the carriage 16 reaches that area of the contact rail—136 in FIG. 8—W in which the hose is to be unwound. We further assume that the collector shoes 81, 83 are supplied in this area with positive, the collector shoes 82, 82' with negative voltage.

The first terminal 157 of the drive motor 121 is permanently connected with the second circuit branch point 142 and is, therefore, supplied with negative voltage under these operating conditions. The same applies to the lower connection of the exciting winding 145 of the first relay 144.

Now, a current flows from the first circuit branch point 141 through the diode 143, which is connected in forward direction so that the exciting winding 145 is excited and the change-over contact 146 is transferred into the position not shown in FIG. 11. Now, positive voltage is supplied via the closed switching contact 154 of the limit switch 153 to the exciting winding 148 of the second relay 153 which has its other connection connected to negative operating voltage. Accordingly, the second relay 147 is changed-over, too, and the change-over contact 149 is transferred into the position not shown in FIG. 11.

In this manner, positive operating voltage is applied also to the second terminal 158, and the drive motor 121 turns in the direction in which the hose is unwound, until the lower end position is reached.

When the lower end position has been reached, the limit switch 153 is changed over, and the switching contact 154 opens so that now the second relay 147 is deenergized to open the switching contact into the position shown in FIG. 11. As a result thereof, the second terminal 158 is deenergized, and the drive motor 121 stops.

Since at this moment the carriage is now as before in the "unwinding area" of the contact rail 136, the diode 143 remains also connected in forward direction, and the first relay 144 remains energized. It is, therefore, of no effect that the switching contact 155 was closed simultaneously when the lower end position was reached, because the change-over contact 146 is still in the reversed position not shown in FIG. 11.

The situation becomes a different one when the carriage enters a "winding area", for example the area of the contact rail 130 in FIG. 8, because here negative operating voltage is applied to the collector shoes 81, 83, and positive operating voltage to the collector shoes 82, 82'.

Due to the permanent connection between the second circuit branch point 142 and the first terminal 157, positive operating voltage is now applied to the latter.

The diode 143, however, is now connected in reverse direction so that the first relay 144 remains deenergized and the change-over contact 146 occupies the position shown in FIG. 11. In this condition, negative operating voltage is supplied via this circuit path through the closed change-over contact 155 of the limit switch 153 to the exciting winding 151 of the third relay 150 so that the change-over contact 152 is shifted into the position not shown in FIG. 11. Thus, the second terminal 158 is likewise supplied with negative operating voltage, and the drive motor 121 turns in the winding direction until the upper end position is reached again.

As a result thereof, the limit switch 153 is returned into the position shown in FIG. 11 so that the switching contact 155 opens to deenergize the third relay 150 and, consequently, to make dead the second terminal 158.

Since in this case, too, the carriage remains in the "winding area" so that the diode 143 is connected in the reverse direction, the closing of the switching contact 154 of the limit switch 153 remains without any effect because the first relay 144 remains in the unexcited condition.

The process described before is repeated only when the carriage enters again an "unwinding area".

It goes without saying that the circuit diagram illustrated in detail in FIG. 11 is meant only as an example. What matters is that one terminal of the drive motor 121 must be permanently connected with one of the collector shoes, while the other terminal must be connected with the other collector shoe via switching sections, the said switching sections being operated by the limit switch and the connection to the other collector shoe being controlled in response to the polarity.

Finally, FIG. 12 shows a plan view of a variant of a carriage 16b travelling in the direction of arrow 25 along the slotted exhaust conduit 18.

The carriage 16b comprises mounting plates 60a, 61a, provided on the vertical sections 44, 44a of the U-shaped stirrups 45, 46, which mounting plates differ from the mounting plates 60, 61 shown in FIGS. 2 to 7 insofar as they have their ends bent off twice by 90° to form legs 170, 171. The mounting plates 60a, 61a can, therefore, be introduced laterally from the outside between the vertical sections 44, 44a so that they come to lie flush with the inner edge of the vertical sections 44, 44a, whereby a small lateral depth of the carriage 16b is ensured. On the other hand, the mounting plates 60a, 61a are screwed to the outside of the vertical sections 44, 44a in the area of the vertical sections, using screws 172, 173, so that the mounting plate 61a, for instance, can be detached from the outside, in the direction of arrow 174, after the screws 172, 173 have been loosened.

This permits the mounting plates to be detached from the carriage 16b, together with all their drive and control units, in next to no time whereby service work and possible repairs are greatly facilitated.

We claim:

1. System for exhausting and collecting gases, in particular motor vehicle exhaust gases in assembly or factory halls, comprising a slotted exhaust conduit (18) fixed in position and provided on one face with an elastic, axial lip seal (42, 43) for guiding in sealed relationship a suction nozzle (55) of at least one carriage (16) which can be moved in the axial direction along guide sections (40, 41), wherein the suction nozzle (55) is connected to a hose (15) and a vacuum is generated in the slotted exhaust conduit (18) through an exhauster (20), characterized in that the carriage (16) is provided with a drive motor (94) whose power take-off shaft (95) is provided with a wheel arranged for engaging the guide section (41) and that the flux of force between the drive motor (94) and the guide section (41) can be closed and interrupted, respectively, by a coupling element switchable by electric means.

2. System according to claim 1, characterized in that the wheel is a friction wheel (96).

3. System according to claim 1, characterized in that the carriage (16) comprises a frame composed of stirrups (45, 46) with sections (44) lying in a plane extending in parallel to the longitudinal axis of the slotted exhaust conduit (18), that the sections of two stirrups (45, 46) are provided with a detachable first mounting plate (60, 60a) and that the drive motor (94) is provided on the said first mounting plate (60).

4. System according to claim 1, characterized in that the position of the drive motor (94) relative to the guide section (41) can be varied by means of an electromagnet (100).

5. System according to claim 4, characterized in that the drive motor is arranged on a lever (91, 92, 93) which can be pivoted by means of a joint and one arm of which is engaged by the electromagnet (100).

6. System according to claim 5, characterized in that the carriage (16) comprises a frame composed of stirrups (45, 46) with sections (44) lying in a plane extending in parallel to the longitudinal axis of the slotted exhaust conduit (18), that the sections (44) of two stirrups (45, 46) are provided with a detachable first mounting plate (60, 60a) and that the drive motor (94) is provided on the said first mounting plate (60), further that the first mounting plate (60) extends in parallel to the longitudinal axis of the slotted exhaust conduit (18) and is provided with a flange (89) directed away from the guide section (41) arranged in the immediate vicinity of the slotted exhaust conduit (18), that the free end of the flange is provided with a hinge (90) carrying a lever plate (91) which points towards the slotted exhaust conduit (18) and the free end (92) of which is engaged by an actuating rod (101) of the electromagnet (100) which is likewise mounted on the mounting plate (60), and that the drive motor (94) is held on a further mounting flange (93) provided on the lever plate (91).

7. System according to claim 6, characterized in that the lever plate (91) is lifted when the flux of force is closed.

8. System according to claim 1, characterized in that an electric switching device (108) is provided for controlling the drive motor (94) and the electrically switchable coupling element.

9. System according to claim 8, characterized in that the switching device (108) is coupled with a proximity switch (104 to 107) acting in the travelling direction of the carriage (16) and operating at least the coupling element when the carriage approaches an obstacle.

10. System according to claim 9, characterized in that the proximity switch (104 to 107) is of the non-contact type and coacts with a reflecting plate (104a) of a carriage (16a) travelling ahead of the carriage (16).

11. System according to claim 8, characterized in that the switching device (108) is coupled with an elongation sensor (125) mounted on the hose (15) in such a manner that the flux of force is closed when a pre-determined amount of elongation of the hose (15) is exceeded.

12. System according to claim 8, characterized in that the switching device (108) is coupled with a pendulum switch (130) provided on the carriage (16), whose switching arm (132) is deflected in response to the movement of the hose (15).

13. System according to claim 8, characterized in that the switching device (108) is provided with a radiation transmitter and/or a radiation receiver and the free end of the hose (15) is provided with a corresponding radiation receiver and/or transmitter (126) so that the flux of force is closed when a pre-determined distance between the free end of the hose (15) and the switching device (108) is exceeded.

14. System according to claim 3, characterized in that a hose lift (30) is fixed to the second detachable mounting plate (61, 61a) of the carriage (16).

15. System according to claim 1, characterized in that the carriage (16) is provided with collector shoes (81 to 83, 114, 115) which coact with contact rails (130, 132 to 136).

16. System according to claim 15, characterized in that separate collector shoes (81 to 83, 114, 115) and separate contact rails (130, 132 to 136) are provided for the drive motor (94), the coupling element and, if necessary, the hose lift (30).

17. System according to claim 16, characterized in that the hose lift (30) comprises a d.c. motor (121) as a drive and that the contact rails (130, 132, 136) which are arranged in pairs comprise first sections (130, 132) exhibiting a first polarity for winding up the hose (15), while second sections (136) exhibit a second polarity for unwinding the hose.

18. System according to claim 17, characterized in that a first terminal (157) of the motor (121) is permanently connected with the collector shoes (82, 83) of the one rail of the pair of contact rails (130, 132, 136) and that a second terminal (158) is connected with two switching sections (147, 148, 149; 150, 151, 152) which can be controlled via an alternately operable pair of limit switches (153, 154, 155) of the motor (121), the switching sections (147, 148, 149; 150, 151, 152) being connectable with the collector shoes (81, 82) of the other rail via a change-over switch (144, 145, 146) which is operated in response to the polarity present at one of the rails.

19. System according to claim 18, characterized in that the change-over switch (144, 145, 146) is actuated via a diode (143) connected with one of the rails.

20. System according to claim 1 or any of claims 14 to 19, characterized in that the drive motor (94) and/or the motor (121) of the hose lift (30) are wiper motors and that the contact rails (130, 132 to 136) are supplied with low voltage.

21. System according to claim 15, characterized in that the carriage (16) is equipped with two collector shoes (81, 83, 114, 115) arranged one behind the other in the travelling direction.

22. System according to claim 21, characterized in that the collector shoes (81, 83, 114, 115) are interconnected at their ends by a spring (86) and that their opposite ends are arranged to pivot laterally relative to the travelling direction.

23. System according to claim 15, characterized in that the collector shoes (82 to 83, 114, 115) can be pivoted vertically.

24. System according to claim 14, characterized in that the first mounting plate (60, 60a) with the drive motor (94), the coupling element and the associated collector shoes (81 to 83) and contact rails (133, 133a, 134, 135) are arranged on the one side, and the second mounting plate (61, 61a with the hose lift (30) and the associated collector shoes (114, 115) and contact rails (130, 132, 136) is arranged on the other side of the carriage (16).

25. System according to claim 24, characterized in that the mounting plates (60a, 61a) are screwed to the carriage (16) laterally from the outside.

26. System according to claim 15, characterized in that the slotted exhaust conduit (18) extends along the side of a return track (27) which have their respective ends interconnected by transposition means (28, 131) or guide section bends, and in which at least the return track (27) is provided with contact rails (134) for the drive motor (94) and the coupling element and at least the transposition means (28, 131) and/or the bends are provided with contact rails (132, 133, 133a, 135, 136) for the hose lift (39) and, if necessary, also for the drive motor (94) and the coupling element.

* * * * *